United States Patent Office 2,999,602
Patented Sept. 12, 1961

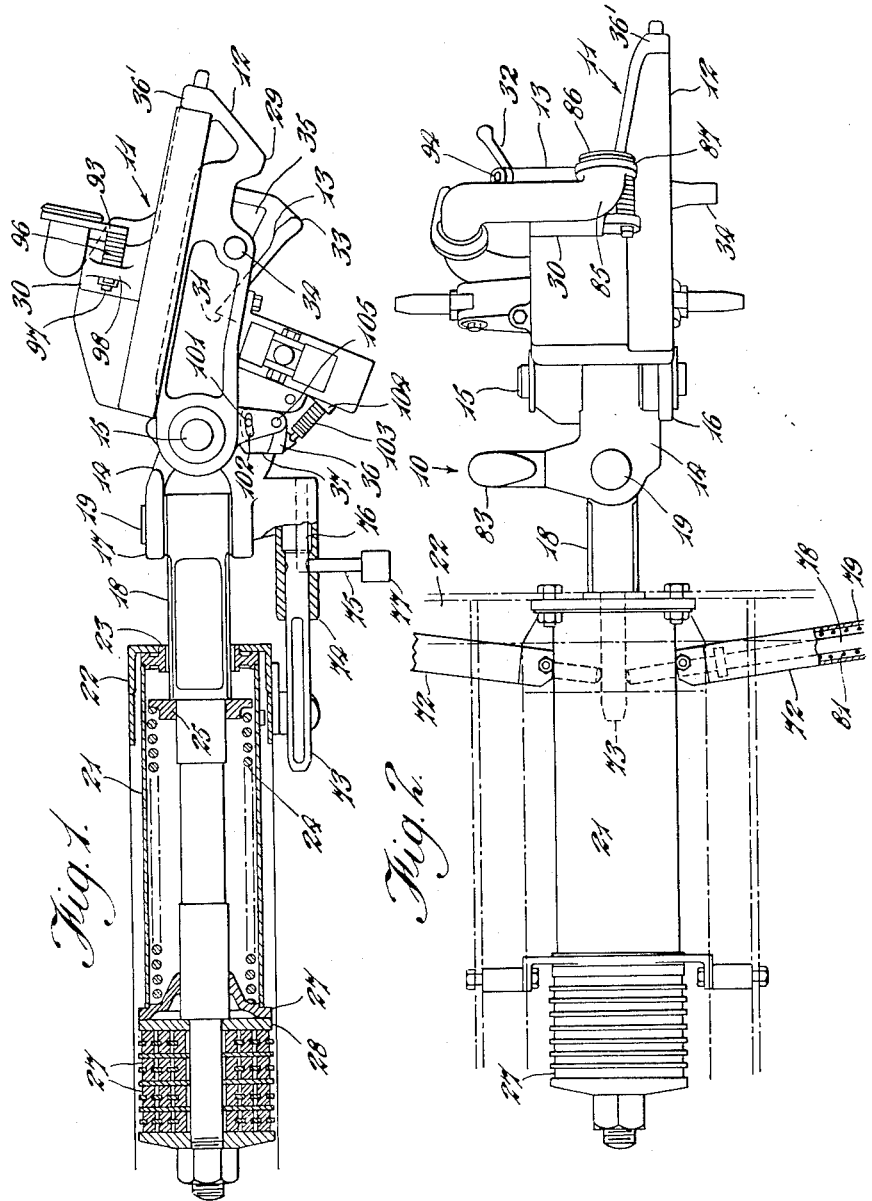

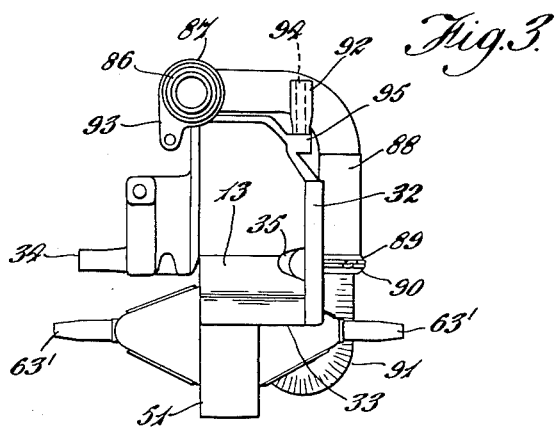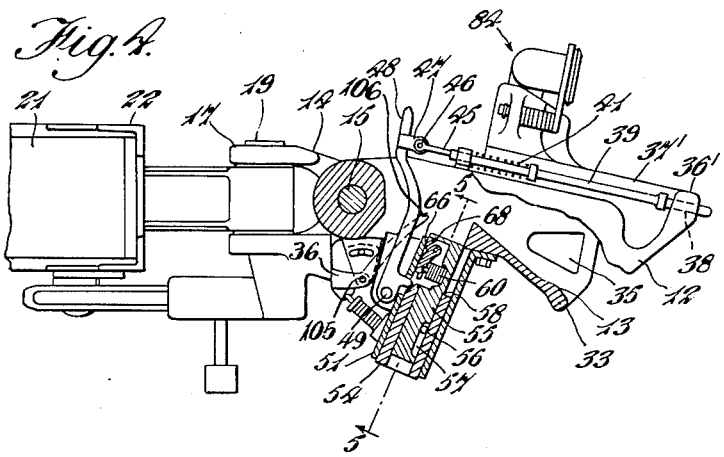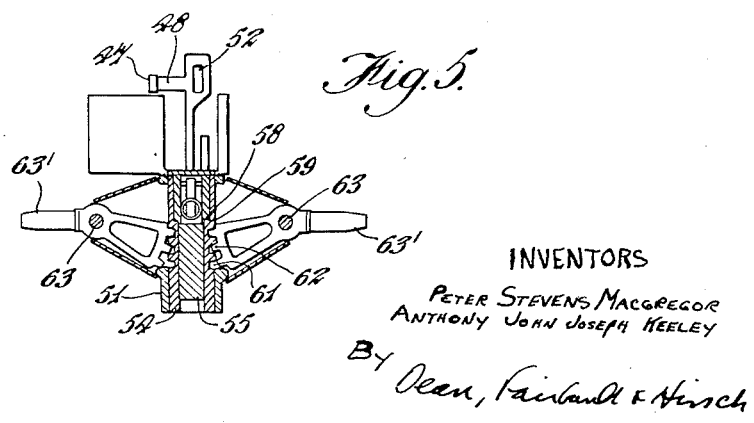

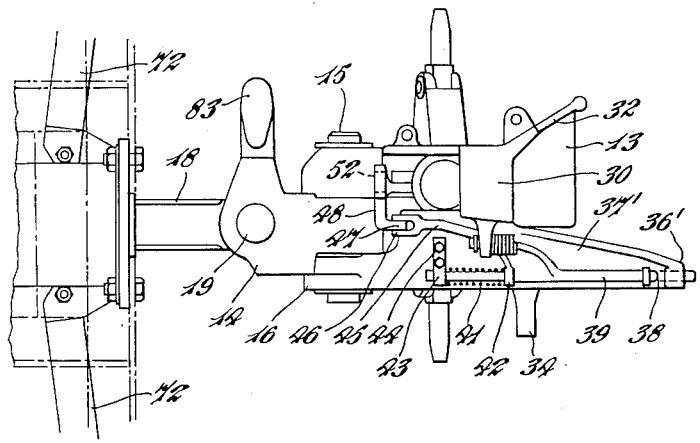

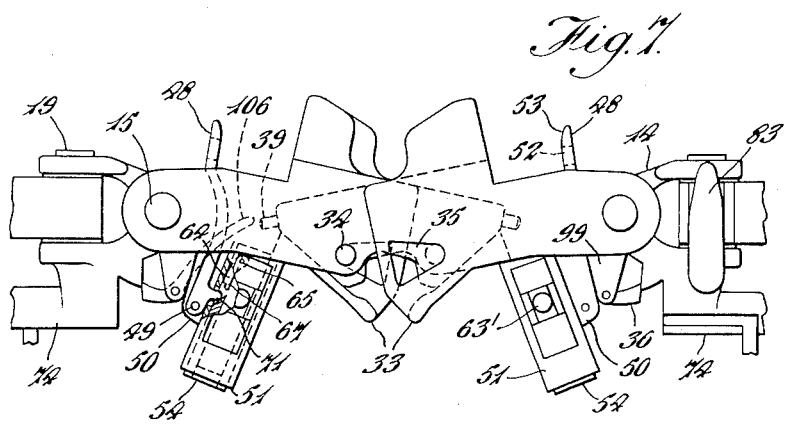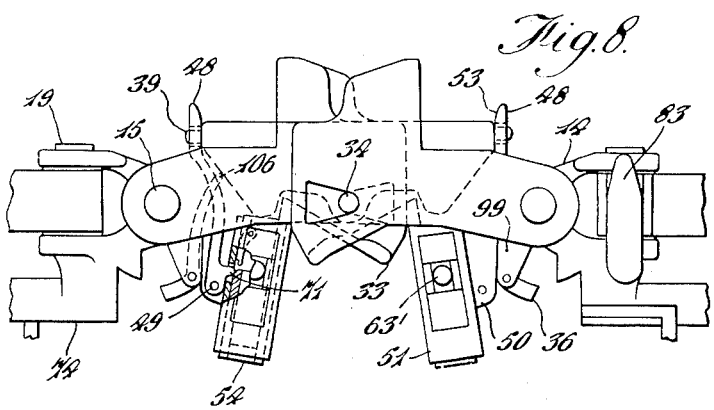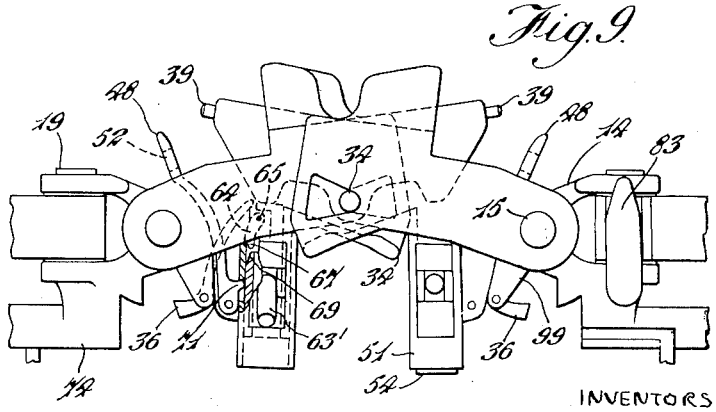

2,999,602
COUPLING DEVICES FOR RAILWAY VEHICLES
Peter S. Macgregor, Poole, and Anthony J. J. Keeley,
Broadstone, England, assignors to Flight Refuelling
Limited, near Blandford, Dorset, England
Filed Sept. 10, 1959, Ser. No. 839,125
8 Claims. (Cl. 213—97)

This invention relates to coupling devices for railway vehicles, and has for its object to provide a coupling device which engages automatically on the coming together of two vehicles, and can be readily uncoupled by an operator.

In our United States patent application Ser. No. 827,019 we have described and claimed a coupling device for railway vehicles comprising a coupling unit mounted for turning movement in a horizontal plane and including a hook mounted for turning movement in a vertical plane and a ramp disposed at one side of the hook to lead a corresponding hook of another coupling unit into engagement with a hook-engaging part on said first coupling unit, the ramp being movable as one with the hook of the same coupling unit and a trip device being provided for lifting the said corresponding hook clear of the hook-engaging part.

The present invention provides modifications of the construction described in the specification above referred to, which increase the adaptability and reliability of the coupling device.

According to the invention a coupling device for railway vehicles comprising a coupling unit mounted for turning movement in a horizontal plane and including a hook mounted for turning movement in a vertical plane and a ramp disposed at one side of the hook to lead a corresponding hook of another coupling unit into engagement with a hook-engaging part on said first coupling unit, the ramp being movable as one with the hook of the same coupling unit and a trip device being provided for lifting the said corresponding hook clear of the hook-engaging part, is characterized in that a locking mechanism is provided on each coupling unit to engage automatically with the other coupling unit when the hooks are in engagement with the hook-engaging parts and prevent the said hooks from being disengaged.

The coupling unit may be movable to a stowed position by turning in a horizontal plane, the stowed position being such that the coupling hook and ramp extend substantially transversely of the vehicle on which the coupling device is mounted, and wherein the coupling unit includes a chain hook moved into an operative position by movement of the coupling unit to the stowed position.

Means may be provided to hold the trip device in its hook-disengaging position to enable it to act as a baulking device preventing engagement of the coupling.

The locking device may comprise a bolt slidable longitudinally with respect to the hook member and a pivoted latch arm having an opening to receive the bolt on a mating coupling device, the bolt and latch arm being coupled together and spring urged into their operative positions.

The bolt and latch arm may be movable to inoperative positions by operation of the trip device to disengage the hooks.

Conveniently a retractable stem mounted in the coupling unit projects, when extended, between a pair of resilient buffer members acting therein to bias the coupling unit to a central position in a horizontal plane, retraction of said stem permitting turning of the coupling unit to the stowed position.

A stop may be provided to co-operate with the retractable stem when the latter is extended with the coupling unit in the stowed position and retain the said unit in that position.

The invention is hereinafter described with reference to the accompanying drawings, in which:

FIGURE 1 is a side elevation of one form of coupling device according to the invention;

FIGURE 2 is a plan view of the coupling device shown in FIGURE 1;

FIGURE 3 is an end view of the coupling device shown in FIGURE 1, the coupling device being in its operative position relative to the vehicle and lifted to the position which it assumes when engaged;

FIGURE 4 is an elevation corresponding to part of FIGURE 1 and showing some parts in section;

FIGURE 5 is a transverse section on the line 5—5 of FIGURE 4;

FIGURE 6 is a plan view similar to FIGURE 2, but with the upper cover and brake pipe connecting fittings removed;

FIGURE 7 is a side elevation showing a pair of coupling devices according to the invention about to reach the position for mutual engagement;

FIGURE 8 is a view similar to FIGURE 7 showing the coupling devices in full engagement;

FIGURE 9 is another view similar to FIGURE 7 showing the coupling devices released ready for separation; and FIGURE 10 is an end view showing a coupling unit in the stowed position.

Referring to the drawings, and more particularly to FIGURES 1, 2 and 3 thereof, the coupling device comprises a coupling unit 10 consisting of a body 11 including a hook arm 12 and a ramp 13, and an intermediate member 14 on which the body 11 is mounted for movement about a horizontal pivot pin 15, the body 11 being forked at 16 to embrace one end of the member 14. The other end of the intermediate member is forked at 17 to receive one end of a stem 18, to which it is attached by a vertical pivot pin 19, the stem 18 extending into a spring housing 21 adapted to be secured to the underframe of a railway vehicle so that the end of the stem 18 supporting the coupling unit 10 projects beyond the buffer beam 22 of the said vehicle. The stem 18 has a portion rectangular in cross-section, which extends through a rectangular guide 23 in the end of the spring housing 21 to prevent rotation of the said stem. A coiled compression spring 24, disposed between a disc 25 abutting against a shoulder on the stem 18, and a fixed abutment 26 in the spring housing, urges the stem 18 outwardly, and a resilient buffer 27, consisting of a plurality of discs of elastomeric material surrounding the stem between an abutment 28 on the spring housing and a disc mounted on the end of the stem 18 remote from the coupling unit 10, provides resilient transmission means for transferring traction loads from the coupling unit to the vehicle.

The hook arm 12 is offset laterally from the vertical central plane of the coupling unit 10 the ramp 13 being positioned alongside it. The hook arm 12 has a downwardly-projecting hook 29 at its free end and the ramp 13 terminates at its end nearest to the intermediate member 14 at a downwardly extending flat hook-receiving surface 31 facing the said intermediate member.

The ramp 13 is bounded on one side by the hook arm, and on the other side by an upstanding wall 32, the surfaces of both of which converge towards the surface 31 from the lip 33 of the ramp 13. The hook arm 12 and the wall 32 are connected one to the other by a bridge 30 over the inner end of the ramp.

The hook arm 12 is provided, on its side remote from the ramp, with a laterally projecting stud 34, and the wall 32 of the ramp 13 is slotted at 35, the slot converging inwardly.

The body 11 of the coupling unit is supported by a stop member 36 thereon co-operating with an abutment surface 37 on the intermediate member 14, in the downwardly inclined position shown in FIGURES 1 and 7, its downward inclination being about 7°. When it is brought up to another similar coupling unit, the hooks 29 of the two units each ride up the ramp 13 of the other unit, the studs 34 each entering the slot 35 in the side wall of the ramp 13 of the other unit. When the hooks 29 reach the ends of the ramps 13, they drop into engagement with the hook-receiving surfaces 31, the studs 34 co-operating with the walls of the slots 35 to prevent the bodies of the two coupling units from dropping beyond a position in which the hooks are fully engaged.

The hook arm 12 is shaped to provide, behind the nose 36' thereof, a recess 37' open at the top and at the outer side of the said arm, and a hole 38 in the said nose, with its axis extending longitudinally of the arm, provides a guide for a bolt 39. The bolt 39 is urged outwardly of the hook arm nose by a coiled compression spring 41 mounted between an enlargement 42 of the bolt 39 and an abutment 43 bolted at 44 to the top of the hook arm 12 and serving also as a second guide for the bolt 39. Integrally formed with the bolt 39 is a curved arm 45 (FIGURE 6) extending from the centre of the said bolt laterally and rearwardly and terminating in a forked end 46 embracing a lug 47 on a latch arm 48 pivoted at 49 to a housing 51 fixed to the underside of the body. The latch arm 48 is formed with an eye 52 so positioned as to receive, when two coupling devices are engaged, the projecting end of the bolt 39 on the other of said devices. Above the eye 52, the latch arm 48 is provided with a guide surface 53 against which the projecting end of the bolt 39 on a mating coupling device will engage as the two hooks ride up the ramps, the bolts 39 pressing back the latch arms 48 until, when the hooks 29 drop into engagement with the hook-receiving surfaces 31, the said bolts 39 slide down the guide surfaces and drop into the eyes 52. The bolt 39 and latch arm 48 are enclosed by a sheet metal cover 50 secured to the body 12 by bolts.

Unlocking of the coupling devices is effected by withdrawing one bolt 39 and its associated latch arm 48, there being no need to move the corresponding parts on the other coupling device.

Means for releasing the locking means and disengaging the hooks 29 from the hook-receiving surfaces 31 are contained in the housing 51 and include a tubular plunger 54 slidable in the said housing in an upward and downward direction, and a second plunger 55 slidable inside the tubular plunger through a range of movement limited by a pin 56 mounted in a chordal hole in the plunger 54 and lying in a recess 57 in the plunger 55. The second plunger 55 forms a trip device for disengaging a hook 29 from the hook-receiving surface 31, being arranged so that its upper end moves across the said surface 31 as the plunger moves upwardly, thus lifting a hook which may be engaging that surface. The second plunger 55 has an enlarged upper end at the bottom of which is a shoulder 58 co-operating with an internal shoulder 59 in the tubular plunger 54 so that upward movement of the tubular plunger is accompanied by upward movement of the second plunger.

The tubular plunger 54 is provided on opposite sides thereof with rack teeth 61 meshing with gear sectors 62 pivoted at 63 between cheeks projecting laterally from the sides of the housing 51 and formed integrally with operating arms 63' by means of which the gear sectors are movable to lift and lower the tubular plunger 54.

A pawl 64 (FIGURE 4) is pivotally mounted at 65 in a cavity in the second plunger 55, and is urged by a coiled compression spring 60 against the wall of the housing 51, the tubular plunger 54 being cut away at 66 to allow the pawl to project therethrough. The pawl is notched at 67, and the wall of the tubular plunger 54 at the top of the cut-away portion 66 has an inclined edge as shown at 68.

The tubular plunger 54, at the lower end of the cut-away portion 66, has an oblique surface 69 forming a ramp to co-operate with a projection 71 on the latch arm 48, so that initial upward movement of the said tubular plunger from its lowermost position rocks the latch arm 48 to its bolt-releasing position.

Downward movement of either one of the operating arms 63' about its pivot 63 lifts the tubular plunger 54, which takes the second plunger 55 with it, until at the end of the upward movement, the pawl is free to move outwardly into a position in which the notch 67 engages the upper end of the wall of the housing 51, retaining the second plunger against downward movement. Since the upper end of the second plunger is then flush with the inner end of the ramp, any hook 27 which may have been engaging the hook-receiving surface is disengaged or, alternatively, engagement of a hook with the said surface is prevented. The second plunger is released and returned to its lowered position by upward movement of either one of the operating arms 63', such movement first causing the tubular plunger to move downwardly independently of the second plunger which is held up by the pawl, until the pawl is deflected inwardly by the inclined edge 68 on the tubular plunger, thus releasing the secured plunger which falls under gravity to its lower position.

Movement of the coupling unit in a horizontal plane about the pivot pin 19 is restrained by the action of a pair of spring buffer devices 72, 72 on a stem 73 slidably mounted in a tubular guide 74 forming part of the intermediate member 14. The stem 73 is retractable into the guide 74 to remove the restraint on the coupling unit, a radial arm 75 fixed to the stem and running in a longitudinal slot 76 in the guide being movable, by rotation of the stem, into a notch at one side of the slot 76 when the stem is extended, to lock the stem in that position. The radial arm 75 carries a weight 77, and extends vertically downwardly when engaged in the notch, so that the weight 77 retains it in the said notch. The buffer devices 72 comprise rods 78 slidable in tubular housings 79 and urged inwardly towards the central vertical plane of the coupling device by coiled compression springs 81.

With the stem 73 retracted the coupling unit can be turned about the pin 19 to a position in which it extends substantially transversely of the vehicle, as shown in FIGURE 10, the coupling unit being retained in this position by re-extending the stem 73 to engage a stop 82 in the buffer beam 22. The intermediate member 14 has integral with it, and projecting at right angles to its length, a hook 83 such as is commonly provided on railway vehicles to receive a coupling chain and, when the coupling unit is stowed, this hook projects in line with the stem 18, so that it can be engaged by a coupling chain on a vehicle not provided with a coupling device according to the invention.

Provision is made for coupling together brake pipes on the vehicles simultaneously with the coupling of the vehicles themselves, and for this purpose there is mounted, above the bridge 30, a pipe coupling member generally indicated by the reference 84.

The pipe coupling member 84 comprises a length of rigid tubing having its two ends bent in two planes at right angles to each other relative to the central portion, one end 85 being bent through a right angle and being fitted with a resiliently deformable lip 86 backed by a rigid flange 87, whereas the other end is bent through rather less than a right-angle and has secured to it by a clip a short length of flexible tubing 88 carrying a coupler 89 for connection to a corresponding coupler 90 on the usual hose extension 91 of the brake pipe on the vehicle. The member 84 has on it lugs 92 and 93 of which the former is formed with a hole to receive a pivot pin 94 extending vertically upwardly from a lug 95 on the side of the bridge 30, the arrangement being such that the central part of the member 84 extends substantially transversely across the vehicle with its end 85 projecting outwardly, and is pivotally movable in a horizontal plane. The lug 93, which is conveniently formed as a radial projection from the flange 87, rests against a resilient buffer 96 formed by a stack of washers or elastomeric material supported on a stem 97 extending through an abutment lug 98 on the bridge 30.

The position of the coupling member 84 is such that, when two coupling units come together and are interlocked, the lips 86 of the coupling members 84 therein engage one another concentrically and are compressed against the flanges 87, thus making a fluid-tight joint between the train pipes on the vehicles.

The stop member 36, as shown in FIGURES 1 and 4, is mounted between a pair of dependent lugs 99 on the intermediate member 14, and is in the form of a bell-crank lever pivoted to the lugs 99 at its elbow, its angular movement about its pivot being restrained by a rod 101 passing through one arm of the said lever and through arcuate slots 102 in the lugs 99. The stop member is urged by a resilient device 103, taking its abutment on a lug 104 carried by the housing 51, towards the position shown in FIGURE 1 in which the other arm thereof will engage the abutment surface 37. The stop member 36 is secured to a spindle 105 passing through holes in the lugs 99 and having secured to one end thereof an arm 106 (FIGURE 4) which extends upwardly into the opening in the body 11 behind the plungers 54, 55, so as to lie in the path of a hook on another coupling device when engagement of the two coupling devices takes place. During the final stages of engagement, the hook contacts the arm 106 and moves it to rock the stop member 36 downwardly clear of the abutment surface 37 thus allowing greater downward inclination of the coupling body when it is engaged. This further movement enables the coupled vehicles to negotiate bumps in the railroad track, but, would prevent effective engagement of the coupling devices if permitted when the latter were uncoupled.

From the foregoing description it will be apparent that the invention provides a coupling device for railway vehicles which provides for automatic coupling of the vehicles where they are brought together, the coupling device being readily releasable when required and also being capable of being set to a position in which coupling is inhibited, so that vehicles can be brought together without coupling taking place. The coupling device also provides for the automatic interconnection and separation of brake pipes on the vehicles, and is movable to a stowed position in which it presents for use a hook to receive a coupling chain, so that vehicles carrying coupling devices according to the invention can be mixed with vehicles having chain couplings.

We claim:

1. A coupling device for railway vehicles comprising a coupling unit mounted for turning movement in a horizontal plane and including a hook for turning movement in a vertical plane and a ramp disposed at one side of the hook to lead a corresponding hook of another coupling unit into engagement with a hook-engaging part on said first coupling unit, the ramp being movable as one with the hook of the same coupling unit and a trip device being provided for lifting the said corresponding hook clear of the hook-engaging part; the combination therewith of a locking mechanism on each coupling unit to engage automatically with the other coupling unit when the hooks are in engagement with the hook-engaging parts and prevent the said hooks from being disengaged, each said locking mechanism comprising a pivotally mounted latch arm having an opening at one end and a slidably mounted bolt adapted to enter the opening of the complementary coupling device, and resilient means normally urging each bolt toward locked position.

2. A coupling device according to claim 1, wherein the coupling unit is movable to a stowed position by turning in a horizontal plane, the stowed position being such that the coupling hook and ramp extend substantially transversely of the vehicle on which the coupling device is mounted, and wherein the coupling unit includes a chain hook moved into an operative position by movement of the coupling unit to the stowed position.

3. A coupling device according to claim 1, wherein means are provided to hold the trip device in its hook-disengaging position to enable it to act as a baulking device preventing engagement of the coupling.

4. A coupling device according to claim 1, wherein the bolt and latch arm are movable to inoperative positions by operation of the trip device to disengage the hooks.

5. A coupling device according to claim 2, wherein a retractable stem mounted in the coupling unit projects, when extended, between a pair of resilient buffer member acting therein to bias the coupling unit to a central position in a horizontal plane, retraction of said stem permitting turning of the coupling unit to the stowed position.

6. A coupling device according to claim 5, wherein a stop is provided to co-operate with the retractable stem when the latter is extended with the coupling unit in the stowed position and retain the said unit in that position.

7. The combination set forth in claim 1 in which stop means are provided movable automatically to an inoperative position when the coupling device is engaged with another similar coupling device, to limit downward movement of the hook and ramp in a vertical plane.

8. The combination set forth in claim 1 in which means are provided for automatically effecting a fluid-tight coupling between train pipes on vehicles carrying said coupling devices when the latter are interengaged, said means comprising pipe coupling members mounted on the coupling units and having open ends brought into substantially concentric engagement one with the other when the coupling devices are engaged, resiliently deformable lips being provided on said open ends and being pressed back against rigid flanges when coupling is effected.

References Cited in the file of this patent

UNITED STATES PATENTS

| | | |
|---|---|---|
| 1,025,785 | Coffin | May 7, 1912 |
| 1,027,207 | Kirkland | May 21, 1912 |
| 1,094,612 | Tomlinson | Apr. 28, 1914 |
| 1,476,869 | Bazeley | Dec. 11, 1923 |
| 2,107,376 | Hoke | Feb. 8, 1938 |
| 2,176,721 | Reid | Oct. 17, 1939 |
| 2,682,340 | Kahler | June 29, 1954 |
| 2,834,481 | Marsh et al. | May 13, 1958 |

OTHER REFERENCES

The Railway Gazette (May 31, 1957, page 625). Copy available in Scientific Library of the Patent Office.